(12) United States Patent
Ewens et al.

(10) Patent No.: US 10,474,113 B2
(45) Date of Patent: Nov. 12, 2019

(54) POWER GENERATION SYSTEM CONTROL THROUGH ADAPTIVE LEARNING

(71) Applicant: General Electric Company, Schenectady, NY (US)

(72) Inventors: David Spencer Ewens, Greer, SC (US); William Forrester Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/454,807

(22) Filed: Mar. 9, 2017

(65) Prior Publication Data
US 2018/0259917 A1 Sep. 13, 2018

(51) Int. Cl.
*G05B 13/04* (2006.01)
*G05B 13/02* (2006.01)
*H02J 3/38* (2006.01)

(52) U.S. Cl.
CPC ....... *G05B 13/041* (2013.01); *G05B 13/0265* (2013.01); *G05B 13/04* (2013.01); *H02J 3/381* (2013.01)

(58) Field of Classification Search
CPC .... G05B 13/041; G05B 13/0265; H02J 3/381
USPC ........................................................ 700/287
See application file for complete search history.

(56) References Cited

U.S. PATENT DOCUMENTS

| | | | |
|---|---|---|---|
| 7,472,100 B2 | 12/2008 | Volponi et al. | |
| 7,860,635 B2 | 12/2010 | Litt | |
| 8,306,791 B2 | 11/2012 | Yerramalla et al. | |
| 8,423,161 B2 | 4/2013 | Wilkes et al. | |
| 8,600,917 B1 | 12/2013 | Schimert et al. | |
| 9,043,118 B2 | 5/2015 | Healy | |
| 2007/0073525 A1 | 3/2007 | Healy et al. | |
| 2011/0153295 A1 | 6/2011 | Yerramalla et al. | |
| 2012/0083933 A1 | 4/2012 | Subbu et al. | |
| 2013/0066615 A1 | 3/2013 | Morgan et al. | |

(Continued)

OTHER PUBLICATIONS

Akhlaghi, S., et al., "Adaptive Adjustment of Noise Covariance in Kalman Filter for Dynamic State Estimation," IEEE Power & Energy Society General Meeting, pp. 1-5 (Jul. 16-10, 2017).

(Continued)

*Primary Examiner* — Robert E Fennema
*Assistant Examiner* — Jigneshkumar C Patel
(74) *Attorney, Agent, or Firm* — Fletcher Yoder, P.C.

(57) ABSTRACT

A system includes a power generation system and a controller. The controller includes processors that receive a first set of inputs. The processors also generate a first set of modeled outputs system based on a model of the power generation system and the first set of inputs. The processors further receive a first set of measured outputs corresponding to the first set of modeled outputs. The processors determine a first correction factor based on the first set of modeled outputs and the first set of measured outputs. The first correction factor includes differences between the first set of modeled outputs and the first set of measured outputs. The processors also generate a second set of modeled outputs based on the model, a second set of inputs, and the first correction factor. The processors further control an operation of the power generation system based on the second set of modeled outputs.

20 Claims, 7 Drawing Sheets

(56) References Cited

U.S. PATENT DOCUMENTS

2013/0185007 A1* 7/2013 Imre .................. G01R 31/3679
                                                                702/63
2015/0185716 A1* 7/2015 Wichmann ............ F01K 23/101
                                                                700/287

OTHER PUBLICATIONS

Mehra, R.K., "On the identification of Variances and Adaptive Kalman Filtering," IEEE Transactions on Automatic Control, vol. 15, Issue 2, pp. 175-184 (Apr. 1970 ).

Extended European Search Report and Opinion issued in connection with corresponding EP Application No. 18156724.9 dated Jul. 27, 2018.

* cited by examiner

POWER GENERATION SYSTEM CONTROL THROUGH ADAPTIVE LEARNING

BACKGROUND

The present disclosure relates generally to power generation systems. In particular, the present disclosure relates to controlling a power generation system through adaptive learning.

A power generation system (e.g., a gas turbine system) may be controlled by modeling the power generation system to estimate certain parameters of the power generation system. The estimated parameters may be used to facilitate efficient operation of the power generation system. For example, efficient scheduling, maintenance (which may shutdown the power generation system), operation settings (e.g., speed and/or time), and the like, may be determined using the estimated parameters.

A model of the power generation system may be generated based on inputs to the power generation system and correction or tuning factors. The model may be tuned in real-time such that a modeled output approximately matches a corresponding measured output via a correction factor (e.g., a multiplier applied to the model). However, the tuning may vary depending on differing ambient and/or operating conditions and include a delay due to a finite amount of response time. While this may be acceptable for slow condition changes, the delay may be significant for control during sufficiently fast transient events (e.g., when the power generation system changes its power output rapidly), resulting in reduced accuracy of the estimated parameters. This accuracy loss may lead to poor controllability of the power generation system and poor balancing of performance and life objectives.

BRIEF DESCRIPTION

Certain embodiments commensurate in scope with the originally claimed invention are summarized below. These embodiments are not intended to limit the scope of the claimed embodiments, but rather these embodiments are intended only to provide a brief summary of possible forms of the invention. Indeed, the presently claimed embodiments may encompass a variety of forms that may be similar to or different from the embodiments set forth below.

In one embodiment, a system includes a power generation system and a controller that controls the power generation system. The controller includes processors that receive a first set of inputs associated with the power generation system that include operating parameters related to the power generation system. The processors also generate a first set of modeled outputs of the power generation system based on a model of the power generation system and the first set of inputs. The processors further receive a first set of measured outputs of the power generation system via sensors of the power generation system. The first set of measured outputs correspond to the first set of modeled outputs. The processors also determine a first correction factor based on the first set of modeled outputs and the first set of measured outputs. The first correction factor includes differences between the first set of modeled outputs and the first set of measured outputs. The processors further receive a second set of inputs associated with the power generation system. The second set of inputs include operating parameters related to the power generation system. The processors also generate a second set of modeled outputs of the power generation system based on the model of the power generation system, the second set of inputs, and the first correction factor. The processors further control an operation of the power generation system based on the second set of modeled outputs.

In another embodiment, a method includes receiving, via processors, a first set of inputs associated with a power generation system. The first set of inputs include operating parameters related to the power generation system. The method also includes generating, via the processors, a first set of modeled outputs of the power generation system based on a model of the power generation system and the first set of inputs. The method further includes receiving, via the processors, a first set of measured outputs of the power generation system via sensors of the power generation system. The first set of measured outputs correspond to the first set of modeled outputs. The method also includes determining, via the processors, a first correction factor based on the first set of modeled outputs and the first set of measured outputs. The first correction factor includes differences between the first set of modeled outputs and the first set of measured outputs. The method further includes receiving, via the processors, a second set of inputs associated with the power generation system. The second set of inputs include the operating parameters related to the power generation system. The method also includes generating, via the processors, a second set of modeled outputs of the power generation system based on the model of the power generation system, the second set of inputs, and the first correction factor. The method further includes controlling, via the processors, an operation of the power generation system based on the second set of modeled outputs.

In yet another embodiment, tangible, non-transitory, machine-readable-media that includes machine-readable instructions to cause processors to receive a first set of inputs associated with a power generation system. The first set of inputs include operating parameters related to the power generation system. The machine-readable instructions also cause the processors to generate a first set of modeled outputs of the power generation system based on a model of the power generation system and the first set of inputs. The machine-readable instructions further cause the processors to receive a first set of measured outputs of the power generation system via sensors of the power generation system. The first set of measured outputs correspond to the first set of modeled outputs. The machine-readable instructions also cause the processors to determine a first correction factor based on the first set of modeled outputs and the first set of measured outputs. The first correction factor includes differences between the first set of modeled outputs and the first set of measured outputs. The machine-readable instructions further cause the processors to receive a second set of inputs associated with the power generation system. The second set of inputs include operating parameters related to the power generation system. The machine-readable instructions also cause the processors to generate a second set of modeled outputs of the power generation system based on the model of the power generation system, the second set of inputs, and the first correction factor. The machine-readable instructions further cause the processors to control an operation of the power generation system based on the second set of modeled outputs.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
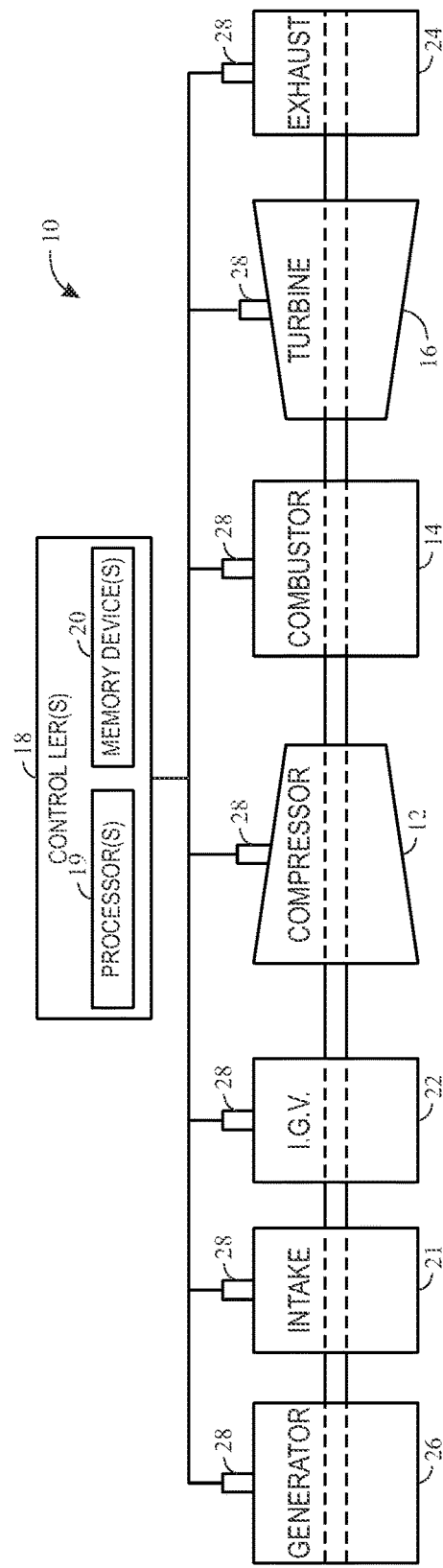
FIG. 1 is a block diagram of a gas turbine system, in accordance with an embodiment of the present disclosure.

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

A power generation system (e.g., a gas turbine system) may be efficiently operated by modeling the power generation system to estimate certain parameters of the power generation system. The modeling may be performed by a model of the power generation system, which may be generated based on inputs to the power generation system and correction or tuning factors. The model may generate modeled outputs that correspond to measured outputs of the power generation system. The model may be tuned such that a modeled output approximately matches a corresponding measured output via a correction factor (e.g., a multiplier applied to the model). The correction factor may be used to more accurately model the power generation system and account for a variety of factors contributing to the modeled output not matching the corresponding measured output, such as machine-to-machine hardware variation, hardware degradation over time, hardware changes (e.g., occurring at service intervals), and the like. Any number of correction factors may be used to approximately match any number of modeled outputs to any number of corresponding measured outputs. Improving model accuracy may result in improved controllability of the power generation system and better balancing of performance and life (of the power generation system) objectives.

The model may be tuned in real-time and account for current ambient and/or operating conditions. However, the tuning may be different at different times due to differing ambient and/or operating conditions. As such, real-time model tuning may vary the correction factor as conditions change. The correction factor may include a filter component that, when applied to the model, approximately matches the modeled output to a corresponding measured output. For example, the filter component may include one or more differences between a set of modeled outputs and a set of corresponding measured outputs. The correction factor may also include an adaptive component that is based on outputs of the power generation system and a previous correction factor. In particular, the adaptive component may estimate future correction factors using previous correction factors as inputs. The modeled output may be subsequently generated based on inputs to the power generation system and the correction factor. In this manner, the correction factor may be determined in real-time with reduced delay, even when ambient and/or operating conditions of the power generation system change. As such, model accuracy may be improved, resulting in improved controllability of the power generation system and better balancing of performance and life (of the power generation system) objectives.

While the present disclosure discusses embodiments associated with a gas turbine system, it should be understood that the systems and methods described in the present disclosure may apply to any suitable power generation system, such as a steam turbine system, wind turbine system, hydroturbine system, combustion engine, hydraulic engine, electric generator, and the like.

FIG. 1 is a block diagram of a power generation system (e.g., a gas turbine system) 10 having a compressor 12, combustor 14, turbine 16, and a controller 18, in accordance with an embodiment of the present disclosure. An intake duct 21 may feed ambient air to the compressor 12. The intake 21 may include ducts, filters, screens, and/or sound-absorbing devices that contribute to pressure loss of the ambient air flowing through the intake 21 into inlet guide vanes 22. An exhaust duct 24 may include sound-absorbing materials and emission control devices that apply a backpressure to the turbine 16. The amount of intake pressure loss and back pressure may vary over time due to the addition of components to and dust and dirt clogging the intake duct 21 and the exhaust duct 24. The turbine 16 may drive a generator 26 that produces electrical power.

The operation of the gas turbine system 10 may be monitored by one or more sensors 28 that may detect various observable conditions of one or more components of the gas turbine system 10 (e.g., the generator 26, the intake 21, etc.) and/or the ambient environment. In some embodiments, multiple redundant sensors may be used to measure the same measured condition. For example, multiple redundant temperature sensors 28 may monitor ambient temperature surrounding the gas turbine system 10, compressor discharge temperature, turbine exhaust gas temperature, and other temperature measurements of the gas stream through the gas turbine system 10. Similarly, multiple redundant pressure sensors 28 may monitor ambient pressure, and static and dynamic pressure levels at the intake duct 21, exhaust duct 24, and/or at other locations in the gas stream through the gas turbine system 10. Multiple redundant humidity sensors 28 (e.g., wet and/or dry bulb thermometers) may measure ambient humidity in the intake duct 21. The redundant sensors 28 may also include flow sensors, speed sensors, flame detector sensors, valve position sensors, guide vane angle sensors, or the like, that sense various parameters pertinent to the operation of gas turbine system 10.

As used herein, a "parameter" refers to a measurable and/or estimable quality that can be used to define an operating condition of the gas turbine system 10, such as temperature, pressure, gas flow, or the like, at defined locations in the gas turbine system 10. Some parameters are measured (i.e., sensed) and are directly known. Other parameters are estimated by a model and are indirectly known. The measured and estimated parameters may be used to represent a given turbine operating state.

The controller 18 may include a computer system having one or more processors 19 (e.g., a microprocessor(s)) that may execute software programs to control the operation of the gas turbine system 10 using sensor inputs and instructions from human operators. Moreover, the processor(s) 19 may include multiple microprocessors, one or more "general-purpose" microprocessors, one or more special-purpose microprocessors, and/or one or more application specific integrated circuits (ASICS), or some combination thereof. For example, the processor(s) 19 may include one or more reduced instruction set (RISC) processors. The controller 18 may couple to one or more memory devices 20 that may store information such as control logic and/or software, look up tables, configuration data, etc. In some embodiments, the processor(s) 19 and/or the memory device(s) 20 may be external to the controller 18. The memory device(s) 20 may include a tangible, non-transitory, machine-readable-medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory device(s) 20 may store a variety of information and may be used for various purposes. For example, the memory device(s) 20 may store machine-readable and/or processor-executable instructions (e.g., firmware or software) for the processor(s) 19 to execute, such as instructions for controlling the gas turbine system 10.

While the present disclosure refers to a single controller 18, it should be understood that the controller 18 may include multiple controllers, computer systems, and/or computer platforms. For example, a first controller may control the gas turbine 16 (e.g., performing control functions including collecting sensor information), while a second controller may be a separate computer platform from the first control logic and perform data analysis associated with the gas turbine 16 (e.g., characterizing degradation, performing the economic analysis, gathering user inputs on costs, providing analysis results, and the like). In such an example, the second controller may communicate with the first controller to receive the sensor information. Both the first controller and the second controller may be collectively referred to as the single controller 18 in the present disclosure.

Figure 2:
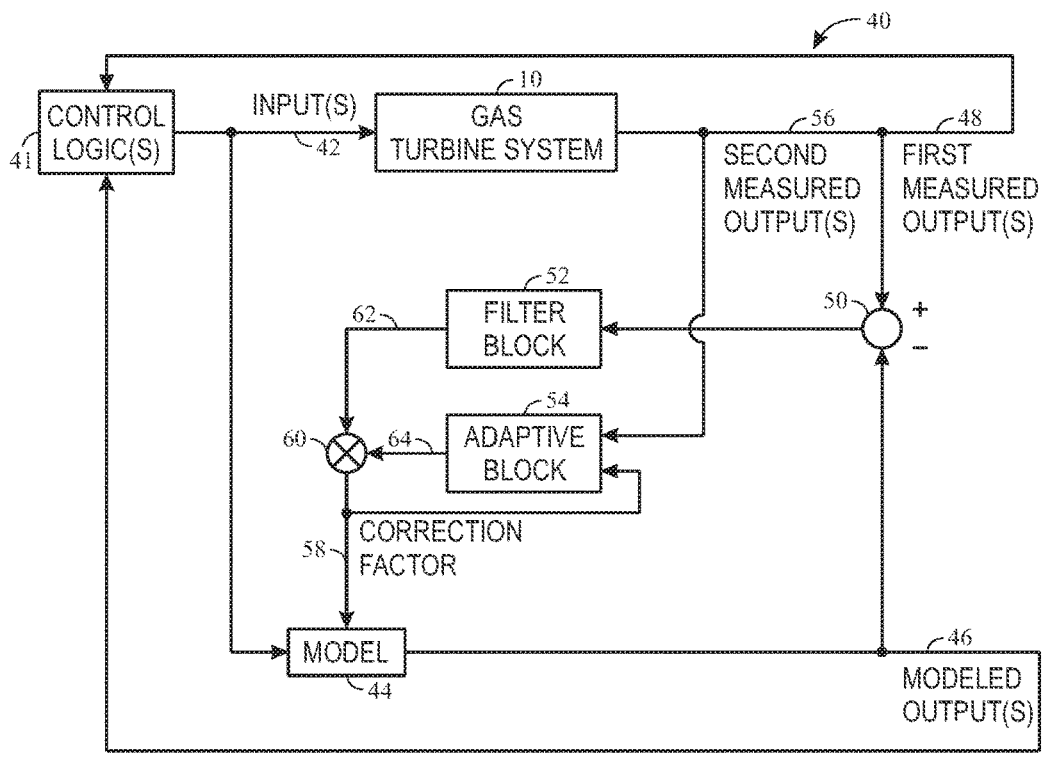
FIG. 2 is a flow diagram of a system for controlling the gas turbine system of FIG. 1 using adaptive learning, in accordance with an embodiment of the present disclosure.

FIG. 2 is a flow diagram of a system 40 for controlling the gas turbine system 10 of FIG. 1 using adaptive learning, in accordance with an embodiment of the present disclosure. Control logic 41 may receive or set one or more inputs (e.g., input values or input parameters) 42 of the gas turbine system 10. The control logic 41 may be stored in the memory device(s) 20 of the controller 18 and executed by the processor(s) 19. The input(s) 42 may be operating parameters that are directly measured by sensors of the gas turbine system 10 and may include, for example, ambient conditions, angles of the inlet guide vanes 22, amount of fuel flowing to the combustor 14, rotational speed of the gas turbine system 10, and the like. The inputs 42 listed above are exemplary and are provided to illustrate that sensed inputs are collected. The specific sensed inputs are not material to this disclosure and will depend on the control system and available sensors at a particular gas turbine installation. The control logic 41 may also send the input(s) 42 to a model 44.

The model 44 may be a computer-generated model of the gas turbine system 10. The model 44 may be stored in the memory device(s) 20 of the controller 18 and executed by the processor(s) 19. The model 44 may generate one or more modeled outputs 46 by simulating operation of the gas turbine system 10 based on the input(s) 42. In some embodiments, the model 44 may be an arrangement of mathematical representations of the modeled outputs 46. Each of these representations may use input values (e.g., the inputs 42) to generate the modeled outputs 46. In some embodiments, the mathematical representations may generate estimated output values that may be used in circumstances where a measured parameter value is not available. The model 44 may be a physics-based aero-thermodynamic computer model, a regression-fit model, neural-net model, or other suitable computer model of a power generation system. In some embodiments, the model 44 may be an adaptive physics-based engine model.

Certain modeled outputs 46 may correspond to first measured outputs 48 (e.g., a first set of one or more measured outputs) of the gas turbine system 10 and may be compared to the first measured outputs 48 to determine accuracy of the model 44. For example, the certain modeled outputs 46 may include a modeled power output (e.g., of the generator 26), a modeled exhaust temperature, a modeled compressor condition, and the like, or any combination thereof. The number and particular parameters corresponding to the modeled outputs 46 may vary between different gas turbine models. The modeled outputs 46 may also vary during operation of the gas turbine system 10. Some modeled outputs 46 may not correspond to parameters of the gas turbine system 10 that are directly measured (e.g., desired fuel flow rate). The modeled outputs 46 may be used by the control logic 41 to operate the gas turbine system 10 (e.g., for efficient scheduling, maintenance, operation settings, and the like).

The first measured outputs 48 may include, but are not limited to, generator or power output, exhaust temperature (e.g., turbine exhaust temperature), compressor condition (e.g., compressor pressure ratio), and the like, or any combination thereof. In some embodiments, the first measured outputs 48 may include one or more ambient parameters (e.g., ambient temperature, ambient pressure, and the like). The control logic 41 may determine a difference 50 between the modeled output(s) 46 and the first measured output(s) 48, and provide the difference 50 to a filter block 52 (e.g., a Kalman filter gain matrix) that may automatically or regularly adjust or tune the model 44 to more accurately fit the modeled output(s) 46 to the first measured output(s) 48 by outputting a filter component 62. The filter block 52 may output the filter component 62 at any suitable frequency (e.g., in real-time, asynchronously, and the like). The filter block 52 may be stored in the memory device(s) 20 of the controller 18 and executed by the processor(s) 19.

The filter block 52 may accurately fit the modeled output(s) 46 to the first measured output(s) 48 with respect to stochastic noise in the first measured output(s) 48 using the filter component 62. The filter component 62 may include a multiplier applied to the model 44 such that the modeled output(s) 46 approximately matches the first measured output(s) 48. Stochastic noise may be noise related to random fluctuations or measurement errors in the first measured output(s) 48 that are not modeled (e.g., sensor noise). However, in some circumstances, the filter block 52 may not fit the modeled output(s) 46 to the first measured output(s) 48 with respect to deterministic noise in the first measured output(s) 48 in a timely manner (e.g., within a threshold time). Deterministic noise may be noise related to the gas turbine system 10 that is too complex or difficult to model or learn. Instead, the control logic 41 may use an adaptive block 54 to address the deterministic noise. The adaptive block 54 may be stored in the memory device(s) 20 of the controller 18 and executed by the processor(s) 19. As such, the control logic 41 may send second measured output(s) 56 (e.g., a second set of one or more measured output(s)) to the adaptive block 54. The second measured outputs 56 may include, but are not limited to, generator or power output, exhaust temperature (e.g., turbine exhaust temperature), compressor condition (e.g., compressor pressure ratio), and the like, or any combination thereof. In some embodiments, the second measured outputs 56 may include one or more ambient parameters (e.g., ambient temperature, ambient pressure, and the like). The second measured output(s) 56 may or may not include some or all of the first measured output(s) 48.

The control logic 41 may also send one or more previous correction factors 58 to the adaptive block 54. The control logic 41 may send the correction factor 58 to tune the model 44 at any suitable frequency (e.g., in real-time, asynchronously, and the like), such that the modeled outputs 46 generated by the model 44 better fit the first measured output(s) 48 of the gas turbine system 10. As illustrated, a correction factor 58 is a product 60 of the filter component 62 and an adaptive component 64. While the correction factor 58 is shown as the product 60 of the filter component 62 and the adaptive component 64, it should be understood that any suitable mathematical combination of the filter component 62 and the adaptive component 64 may be used to generate the correction factor 58. The correction factor 58 is then input to the model 44. The adaptive block 54 may generate the adaptive component 64 based on an algorithm that represents the correction factor 58 as a function of the second measured output(s) 56. Any suitable algorithm may be used to represent the correction factor 58 as a function of the second measured output(s) 56, such as an algorithm based on least squares regression, auto-regression moving average, subspace identification, linear quadratic estimator, and the like. The adaptive block 54 may use the previous correction factor(s) 58 to accurately generate the algorithm. The control logic 41 may instruct the adaptive block 54 to update the algorithm at any suitable frequency (e.g., in real-time, asynchronously, and the like). The previous correction factor(s) 58 may be stored (e.g., in the memory device(s) 20) over time along with previous values of the second measured output(s) 56. The adaptive block 54 may generate any suitable number of adaptive components 64 based on any suitable number of algorithms that represent any number of correction factors 58 as functions of any number of second measured outputs 56. For example, as illustrated in FIGS. 8-11, the adaptive block 54 may generate a four adaptive component 64 based on relationships between two correction factors 58 (e.g., filter component 1 and filter component 2) and two second measured outputs 56 (measured output 1 and measured output 2).

In some embodiments, an offline computing platform may send the correction factor 58 to tune the model 44 or instruct the adaptive block 54 to update the algorithm instead of or in addition to the control logic 41. In some embodiments, the control logic 41 may generate the filter component 62 using the filter block 52 in real-time (e.g., synchronously), while generating the adaptive component 64 asynchronously (e.g., once every minute, ten minutes, half hour, hour, twelve hours, day, week, and the like). As such, the correction factor 58 may be a product of a real-time filter component 62 (that may be constantly updated) and an asynchronous adaptive component 64 (that may be periodically updated).

The control logic 41 may use the algorithm to estimate future correction factors 58. The control logic 41 may input the estimated future correction factors 58 into the model 44 to reduce variation in future correction factors 58 across varying ambient and operating conditions (e.g., as represented by the second measured output(s) 56). As such, accuracy of the model 44 and modeled outputs 46 during fast transient events may be improved and benefit control accuracy of the gas turbine system 10.

Figure 3:
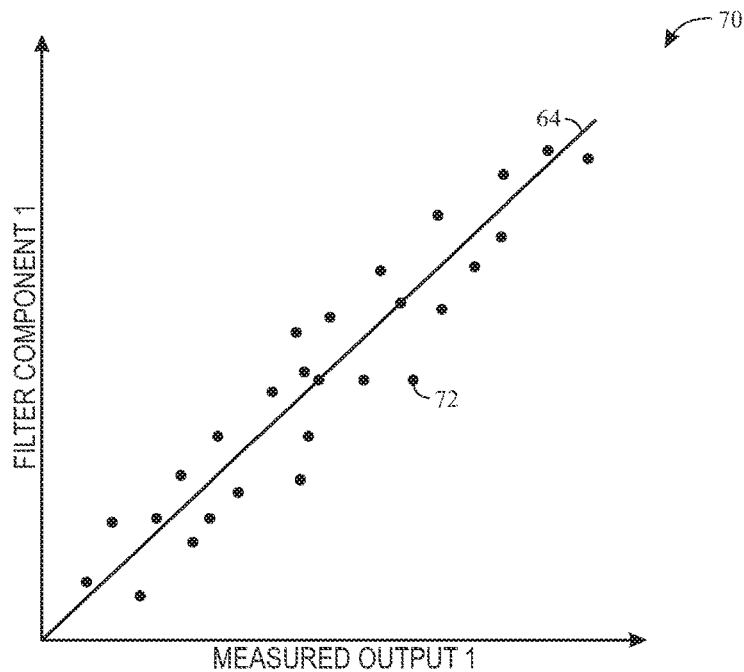
FIG. 3 is a graph expressing a first filter component of a correction factor of the gas turbine system of FIG. 1 in terms of a first measured output of the gas turbine system before using an adaptive component of the correction factor, in accordance with an embodiment of the present disclosure.

As examples of how the system 40 controls the gas turbine system 10 of FIG. 1 via adaptive learning, FIGS. 3-6 first illustrate examples of relationships between filter components and measured outputs before adaptive learning is used. Specifically, FIG. 3 is an example graph 70 expressing a filter component 1 in terms of a measured output 1 before using the adaptive component 64 in the correction factor 58, in accordance with an embodiment of the present disclosure. The filter component 1 may be a filter component 62 generated at a time that the gas turbine system 10 outputs the measured output 1, plotted as a data point (e.g., 72). For example, the filter component 1 may be an amount of fuel flowing to the combustor 14 and the measured output 1 may be a power output of the gas turbine system 10. For the purposes of this example, the measured output 1 may be both a first measured output 48 and a second measured output 56. The graph 70 illustrates that the filter block 52 generates each filter component 62 at a certain time. As such, each filter component (e.g., filter component 1) is based on a single corresponding measured output (e.g., measured output 1)—as shown by the collection of data points (including 72). However, the adaptive block 54 may generate the adaptive component 64 based on the collection of data points (including 72). The adaptive component 64 may be function that provides a good (e.g., best) fit to the data points 72. In graph 70, the adaptive block 54 determines that the filter component 1 (e.g., the amount of fuel flowing to the combustor 14) varies directly with the measured output 1 (e.g., the power output of the gas turbine system 10).

Figure 4:
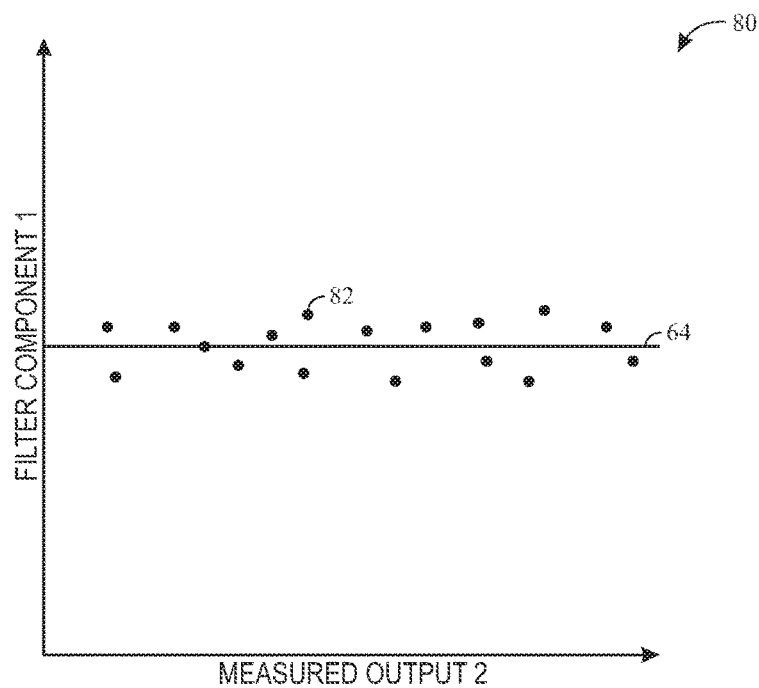
FIG. 4 is a graph expressing the first filter component in terms of a second measured output of the gas turbine system of FIG. 1 before using the adaptive component, in accordance with an embodiment of the present disclosure.

FIG. 4 is an example graph 80 expressing the filter component 1 in terms of a measured output 2 before using the adaptive component 64 in the correction factor 58, in accordance with an embodiment of the present disclosure. Similar to the measured output 1 of graph 70 of FIG. 3, the filter component 1 may be a filter component 62 generated at a time that the gas turbine system 10 outputs the measured output 2, plotted as a data point (e.g., 82). That is, each filter component (e.g., filter component 1) is based on a single corresponding measured output (e.g., measured output 2)—as shown by the collection of data points (including 82). The filter component 1 may be an amount of fuel flowing to the combustor 14 and the measured output 2 may be an exhaust temperature of the gas turbine system 10. For the purposes of this example, the measured output 2 may be both a first measured output 48 and a second measured output 56. The adaptive block 54 may generate the adaptive component 64 based on the collection of data points (including 82). The adaptive component 64 may be function that provides a good (e.g., best) fit to the data points 82. Here, the adaptive block 54 determines that the filter component 1 (e.g., the amount of fuel flowing to the combustor 14) is not affected by the measured output 2 (e.g., the exhaust temperature of the gas turbine system 10).

Figure 5:
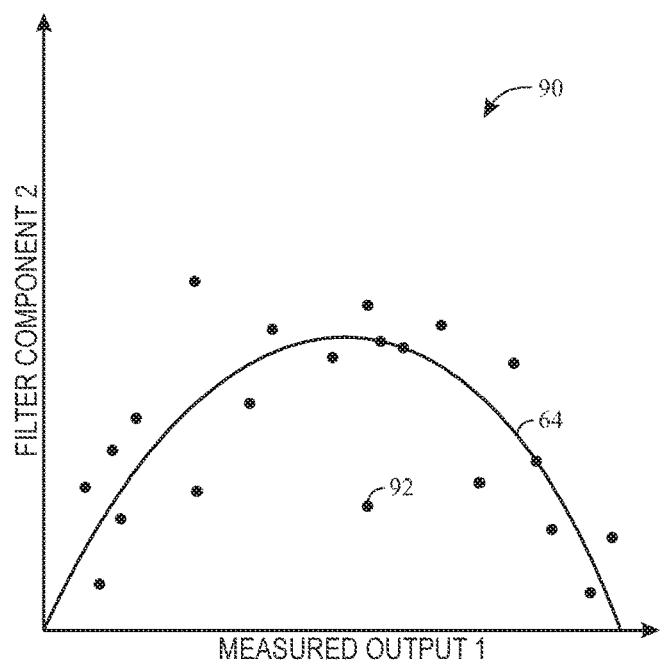
FIG. 5 is a graph expressing a second filter component of the correction factor in terms of the first measured output before using the adaptive component, in accordance with an embodiment of the present disclosure.

FIG. 5 is an example graph 90 expressing a filter component 2 in terms of the measured output 1 before using the adaptive component 64 in the correction factor 58, in accordance with an embodiment of the present disclosure. Similar to the filter component 1 of graph 70 of FIG. 3, the filter component 2 may be a filter component 62 generated at a time that the gas turbine system 10 outputs the measured output 1, plotted as a data point (e.g., 92). That is, each filter component (e.g., filter component 2) is based on a single corresponding measured output (e.g., measured output 1)—as shown by the collection of data points (including 92). The filter component 2 may be a rotational speed of the gas turbine system 10 and the measured output 1 may be a power output of the gas turbine system 10. The adaptive block 54 may generate the adaptive component 64 based on the collection of data points (including 92). The adaptive component 64 may be function that provides a good (e.g., best) fit to the data points 92. Here, the adaptive block 54 determines that the filter component 2 (e.g., the rotational speed of the gas turbine system 10) has a second order relationship with the measured output 1 (e.g., the power output of the gas turbine system 10).

Figure 6:
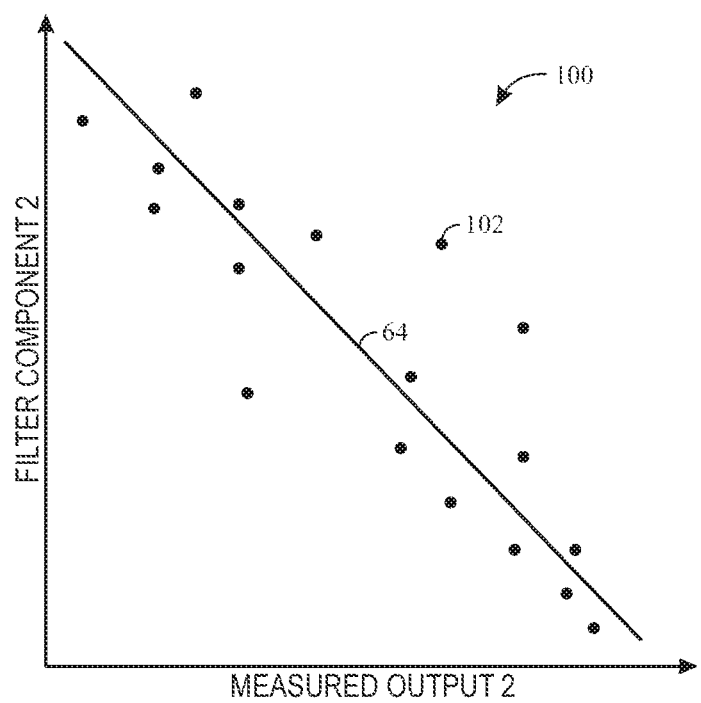
FIG. 6 is a graph expressing the second filter component in terms of the second measured output before using the adaptive component, in accordance with an embodiment of the present disclosure.

FIG. 6 is an example graph 100 expressing the filter component 2 in terms of the measured output 2 before using the adaptive component 64 in the correction factor 58, in accordance with an embodiment of the present disclosure. Similar to the filter component 2 of graph 90 of FIG. 5, the filter component 2 may be a filter component 62 generated at a time that the gas turbine system 10 outputs the measured output 2, plotted as a data point (e.g., 102). That is, each filter component (e.g., filter component 2) is based on a single corresponding measured output (e.g., measured output 2)—as shown by the collection of data points (including 102). The filter component 2 may be a rotational speed of the gas turbine system 10 and the measured output 2 may be an exhaust temperature of the gas turbine system 10. The adaptive block 54 may generate the adaptive component 64 based on the collection of data points (including 102). The adaptive component 64 may be function that provides a good (e.g., best) fit to the data points 102. Here, the adaptive block 54 determines that the filter component 2 (e.g., the rotational speed of the gas turbine system 10) varies inversely with the measured output 2 (e.g., the exhaust temperature of the gas turbine system 10).

Figure 7:
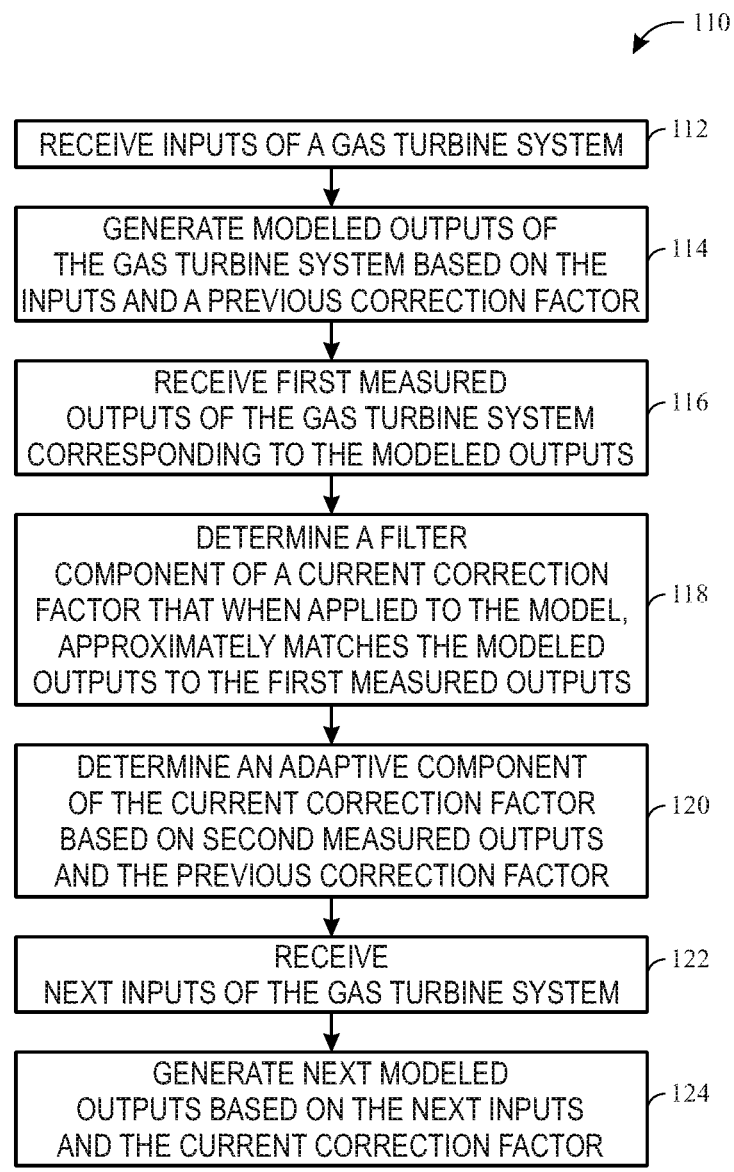
FIG. 7 is a flowchart of a method for controlling the gas turbine system of FIG. 1 using adaptive learning, in accordance with an embodiment of the present disclosure.

With this in mind, FIG. 7 is a flowchart of a method 110 for controlling the gas turbine system 10 of FIG. 1 using adaptive learning, in accordance with an embodiment of the present disclosure. Any suitable device that may control components of the gas turbine system 10, such as the controller 18, may implement the method 110. While the method 110 is described using steps in a specific sequence, it should be understood that the present disclosure contemplates that the describe steps may be performed in different sequences than the sequence illustrated, and certain described steps may be skipped or not performed altogether. In some embodiments, the method 110 may be implemented by executing instructions stored in a tangible, non-transitory, computer-readable medium, such as the memory device(s) 20, using a processor, such as the processor(s) 19. In certain embodiments, the controller 18 may perform the method 110, but it should be noted that any suitable computing system may perform the method 110.

The method 110 may be implemented after the controller 18 generates at least a first correction factor 58. For example, the control logic 41 in the controller 18 may generate modeled output(s) 46 of the gas turbine system 10 based on input(s) 42 of the gas turbine system 10. The control logic 41 may then receive first measured output(s) of the gas turbine system 48 corresponding to the modeled output(s) 46. The control logic 41 may determine a filter component 62 of the at least first correction factor 58 that, when applied to the model 44, approximately matches the modeled output (s) 46 to the first measured output(s). As such, the first correction factor 58 may not include an adaptive component 64, as there was not a previous correction factor 58 used to generate the adaptive component 64.

Once the control logic 41 generates at least the first correction factor 58, the control logic 41 may receive (block 112) an input(s) 42 of the gas turbine system 10. The input(s) 42 may be in the form of a vector that expresses multiple inputs 42. The control logic 41 may then generate (block 114) a modeled output(s) 46 of the gas turbine system 10 based on the input(s) 42 and a previous correction factor(s) 58. The modeled output(s) 46 may be in the form of a vector that expresses multiple modeled outputs 46. The modeled output(s) 46 may be generated using the model 44 and may include, for example, a modeled power output (e.g., of the generator 26), a modeled exhaust temperature, a modeled compressor condition, and the like. The previous correction factor(s) 58 may be generated by the control logic 41 based on a difference 50 between previous modeled output(s) 46 and previous first measured output(s) 48 of the gas turbine system 10.

The control logic 41 may also receive (block 116) a first measured output(s) 48 of the gas turbine system 10 corresponding to the modeled output(s) 46. The first measured output(s) 48 may be in the form of a vector that expresses multiple first measured outputs 48. The first measured output(s) 48 may include generator or power output, exhaust temperature (e.g., turbine exhaust temperature), compressor condition (e.g., compressor pressure ratio), and the like.

Once the control logic 41 generates (from block 114) the modeled output(s) 46 of the gas turbine system 10 and receives (from block 116) the modeled output(s) 46 of the gas turbine system 10, the control logic 41 may determine (block 118) a filter component 62 of a current correction factor 58, that, when applied to the model 44, approximately matches the modeled output(s) 46 to the first measured output(s) 48. The filter component 62 and/or the correction factor 58 may be in the form of vectors that express multiple filter components 62 and/or multiple correction factors 58. The filter component 62 may be generated by the filter block 52 to accurately fit the modeled output(s) 46 to the first measured output(s) 48.

Afterwards, the control logic 41 may determine (block 120) an adaptive component 64 of the current correction factor 58 based on a second measured output(s) 56 and the previous correction factor(s) 58. The second measured output(s) 56 may be in the form of a vector that expresses multiple second measured outputs 56. The second measured output(s) 56 may include generator or power output, exhaust temperature (e.g., turbine exhaust temperature), compressor condition (e.g., compressor pressure ratio), and the like. The second measured output(s) 56 may or may not include some or all of the first measured output(s) 48. The adaptive component 64 may be based on an algorithm generated by the adaptive block 54 that represents the correction factor 58 as a function of second measured output(s) 56. The adaptive block 54 may use the previous correction factor(s) 58 to accurately generate the algorithm.

After determining (from block 120) the adaptive component 64 of the current correction factor 58, the control logic 41 may receive (block 122) next input(s) 42 (a subsequent set of input(s) 42) of the gas turbine system 10. The control logic 41 may then generate (block 124) next modeled output(s) 46 (a subsequent set of modeled output(s) 46) based on the next input(s) 42 and the current correction factor 58. The control logic 41 may determine the current correction factor by multiplying 60 the filter component 62 by the adaptive component 64. Because the control logic 41 determines the adaptive component 64 (in block 120) based on the previous correction factor(s) 58 that include the previous adaptive component(s) 64, the control logic 41 adapts to or learns and accommodates for the behavior causing the noise (e.g., deterministic noise) not reduced by the filter component 62. For instance, the control logic 41 may use the adaptive component 64 to estimate future correction factors 58 because the previous correction factor(s) 58 are used as an input. In this manner, the correction factor 58 may be determined in real-time with reduced delay, even when ambient and/or operating conditions of the gas turbine system 10 change. As such, model accuracy may be improved, resulting in improved controllability of the gas turbine system 10 and better balancing of performance and life (of the gas turbine system 10) objectives.

The control logic 41 may use the next modeled output(s) 46 to control the gas turbine system 10. In particular, the modeled output(s) 46 may be input to the control logic 41 to drive control of the gas turbine system 10. For example, the control logic 41 may use the next modeled output(s) 46 to determine efficient times to shutdown and/or restart the gas turbine system 10. The control logic 41 may also use the next modeled output(s) 46 efficient speeds to run the gas turbine system 10 and for what duration. The control logic 41 may thus use the next modeled output(s) 46 to efficiently schedule operations (e.g., runtime, start time, shutdown time) of the gas turbine system 10, schedule maintenance (which may shutdown the power generation system) of the gas turbine system 10, adjust operation settings (e.g., operational speed and/or time) of the gas turbine system 10, and the like.

Figure 8:
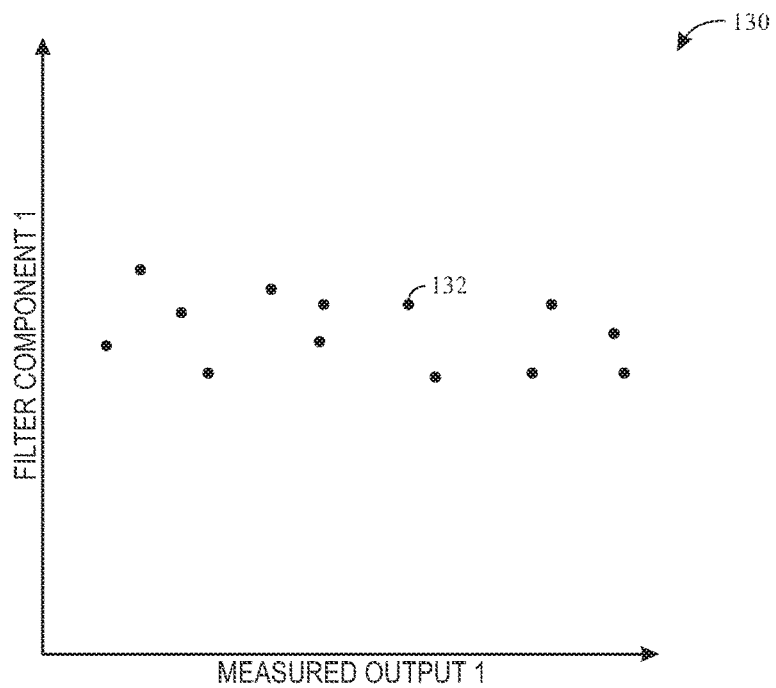
FIG. 8 is a graph expressing the first filter component in terms of the first measured output, as shown in FIG. 3, after using a first adaptive component, in accordance with an embodiment of the present disclosure.

FIG. 8 is a graph 130 expressing the filter component 1 in terms of the measured output 1, as shown in FIG. 3, after using a first adaptive component 64 in the correction factor 58, in accordance with an embodiment of the present disclosure. The data points (e.g., 132) represent the filter component 1 generated at a time that the gas turbine system 10 outputs the measured output 1, wherein the correction factor 58 includes both the filter component 1 and the first adaptive component 64. Because the data points (including 132) are generally in the form of a straight line with a slope of 1, the graph 130 illustrates that the filter component 1 is not affected by the measured output 1. The noise exhibited by the data points indicate stochastic noise, which the filter block 52 may be suited to address (e.g., reduce).

Figure 9:
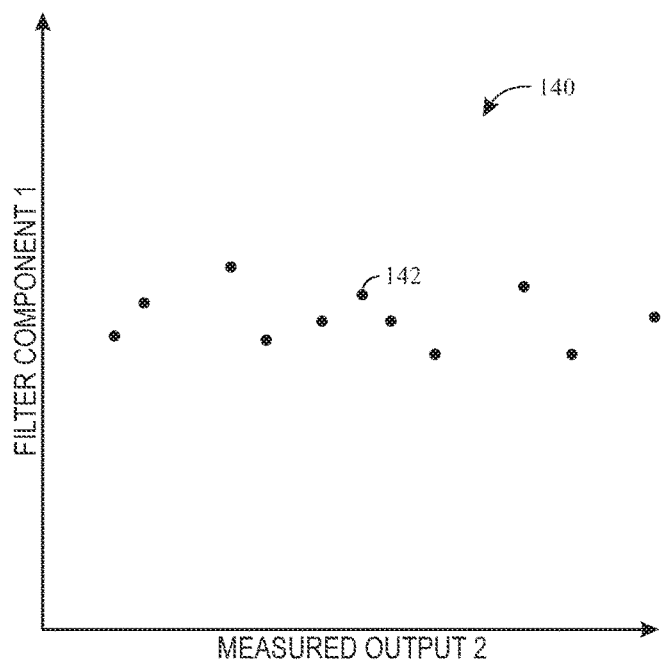
FIG. 9 is a graph expressing the first filter component in terms of the second measured output, as shown in FIG. 4, after using a second adaptive component, in accordance with an embodiment of the present disclosure.

FIG. 9 is a graph 140 expressing the filter component 1 in terms of the measured output 2, as shown in FIG. 4, after using a second adaptive component 64 in the correction factor 58, in accordance with an embodiment of the present disclosure. The data points (e.g., 142) represent the filter component 1 generated at a time that the gas turbine system 10 outputs the measured output 2, wherein the correction factor 58 includes both the filter component 1 and the second adaptive component 64. Because the data points (including 142) are generally in the form of a straight line with a slope of 1, the graph 140 illustrates that the filter component 1 is not affected by the measured output 2. The noise exhibited by the data points indicate stochastic noise, which the filter block 52 may be suited to address (e.g., reduce).

Figure 10:
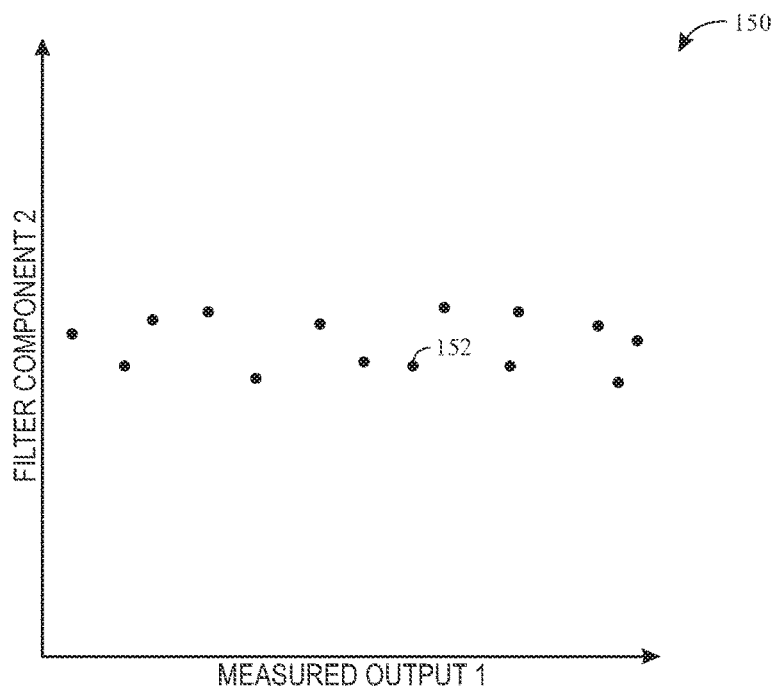
FIG. 10 is a graph expressing the second filter component in terms of the first measured output, as shown in FIG. 5, after using a third adaptive component, in accordance with an embodiment of the present disclosure.

FIG. 10 is a graph 150 expressing the filter component 2 in terms of the measured output 1, as shown in FIG. 5, after using a third adaptive component 64 in the correction factor 58, in accordance with an embodiment of the present disclosure. The data points (e.g., 152) represent the filter component 2 generated at a time that the gas turbine system 10 outputs the measured output 1, wherein the correction factor 58 includes both the filter component 2 and the third adaptive component 64. Because the data points (including 152) are generally in the form of a straight line with a slope of 1, the graph 150 illustrates that the filter component 2 is not affected by the measured output 1. The noise exhibited by the data points indicate stochastic noise, which the filter block 52 may be suited to address (e.g., reduce).

Figure 11:
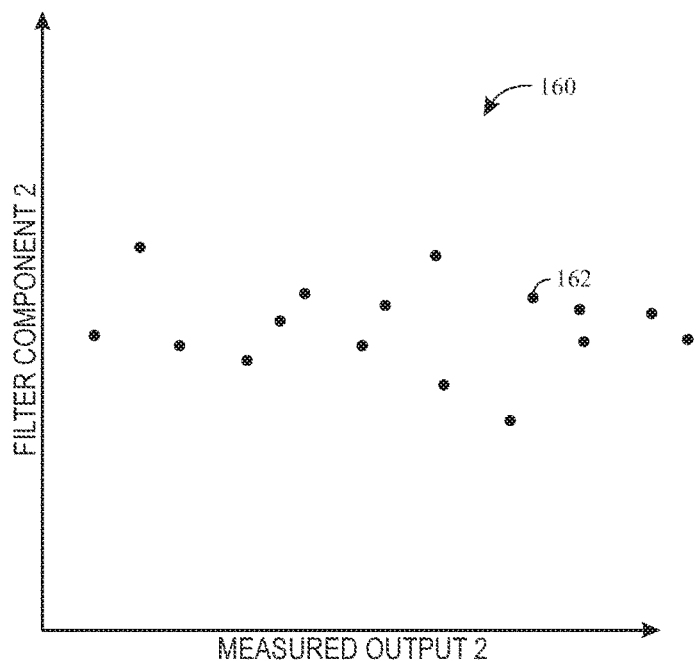
FIG. 11 is a graph expressing the second filter component in terms of the second measured output, as shown in FIG. 6, after using a fourth adaptive component, in accordance with an embodiment of the present disclosure.

FIG. 11 is a graph 160 expressing the filter component 2 in terms of the measured output 2, as shown in FIG. 6, after using a fourth adaptive component 64 in the correction factor 58, in accordance with an embodiment of the present disclosure. The data points (e.g., 162) represent the filter component 2 generated at a time that the gas turbine system 10 outputs the measured output 2, wherein the correction factor 58 includes both the filter component 2 and the fourth adaptive component 64. Because the data points (including 162) are generally in the form of a straight line with a slope of 1, the graph 160 illustrates that the filter component 2 is not affected by the measured output 2. The noise exhibited by the data points indicate stochastic noise, which the filter block 52 may be suited to address (e.g., reduce).

In this manner, the correction factor 58 may be determined in real-time with reduced delay, even when ambient and/or operating conditions of the gas turbine system 10 change. As such, model accuracy may be improved, resulting in improved controllability of the gas turbine system 10 and better balancing of performance and life (of the gas turbine system 10) objectives.

Technical effects of the subject matter disclosed herein include, but are not limited to controlling a gas turbine system 10 using adaptive learning. In particular, the gas turbine system 10 may be controlled by determining a correction factor 58 to tune modeled outputs 46 of the gas turbine system 10 based on measured outputs 56 of the gas turbine system 10 and a previous correction factor 58. By using the previous correction factor 58 to determine the (current) correction factor 58, the correction factor 58 may be determined in real-time with reduced delay, even when ambient and/or operating conditions of the gas turbine system 10 change. As such, model accuracy may be improved, resulting in improved controllability of the gas turbine system 10 and better balancing of performance and life (of the gas turbine system 10) objectives.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a power generation system; and
   a controller configured to control the power generation system, comprising one or more processors, wherein the one or more processors are configured to:
   receive a first set of inputs associated with the power generation system, wherein the first set of inputs comprise one or more operating parameters related to the power generation system;
   generate a first set of modeled outputs of the power generation system based on a model of the power generation system and the first set of inputs;
   receive a first set of measured outputs of the power generation system via one or more sensors of the power generation system, wherein the first set of measured outputs correspond to the first set of modeled outputs;
   determine a filter component that, when applied to the model of the power generation system, approximately matches the first set of modeled outputs to the first set of measured outputs;
   determine an adaptive component based on an algorithm that represents a previous correction factor as a function of the first set of measured outputs, wherein the algorithm is based on least squares regression, auto-regression moving average, sub-space identification, or linear quadratic estimator;
   determine a current correction factor comprising a product of the filter component and the adaptive component;
   receive a second set of inputs associated with the power generation system, wherein the second set of inputs comprise the one or more operating parameters related to the power generation system;
   generate a second set of modeled outputs of the power generation system based on the model of the power generation system, the second set of inputs, and the current correction factor; and
   control an operation of the power generation system based on the second set of modeled outputs.

2. The system of claim 1, wherein the one or more processors are configured to generate the second set of modeled outputs by:
   receiving a second set of measured outputs of the power generation system via the one or more sensors of the power generation system, wherein the second set of measured outputs correspond to the second set of modeled outputs; and
   determining a next correction factor based on the second set of modeled outputs and the second set of measured outputs, wherein the next correction factor comprises:
   a second filter component that comprises one or more differences between the second set of modeled outputs and the second set of measured outputs; and
   a second adaptive component based on the second set of measured outputs and the next correction factor.

3. The system of claim 2, wherein the adaptive component is associated with a second algorithm that represents the next correction factor in terms of the second set of measured outputs.

4. The system of claim 2, wherein the second filter component is configured to reduce stochastic noise in the first set of measured outputs.

5. The system of claim 2, wherein the second adaptive component is configured to reduce deterministic noise in the first set of measured outputs.

6. The system of claim 2, wherein the second set of measured outputs comprises power output, exhaust temperature, a compressor condition, or any combination thereof.

7. The system of claim 2, wherein the first set of measured outputs comprises at least one measured output of the second set of measured outputs.

8. The system of claim 2, wherein the first set of measured outputs and the second set of measured outputs are different.

9. The system of claim 1, wherein the one or more processors are configured to control the operation of the power generation system by scheduling the operation of the power generation system based on the second set of modeled outputs.

10. The system of claim 9, wherein the one or more operation settings comprise an operational speed of the power generation system, an operational time of the power generation system, or any combination thereof.

11. The system of claim 1, wherein the operation is associated with maintenance of the power generation system based on the second set of modeled outputs.

12. The system of claim 1, wherein the one or more processors are configured to control the operation of the power generation system by adjusting one or more operation settings of the power generation system based on the second set of modeled outputs.

13. The system of claim 1, wherein the one or more processors are configured to use the algorithm to estimate a first set of future correction factors.

14. The system of claim 13, wherein the one or more processors are configured to input the first set of future correction factors into the model to reduce variation in a second set of future correction factors across varying ambient and operating conditions.

15. A method, comprising:
   receiving, via one or more processors, a first set of inputs associated with a power generation system, wherein the first set of inputs comprise one or more operating parameters related to the power generation system;

generating, via the one or more processors, a first set of modeled outputs of the power generation system based on a model of the power generation system and the first set of inputs;

receiving, via the one or more processors, a first set of measured outputs of the power generation system via one or more sensors of the power generation system, wherein the first set of measured outputs correspond to the first set of modeled outputs;

determining, via the one or more processors, a filter component that, when applied to the model of the power generation system, approximately matches the first set of modeled outputs to the first set of measured outputs;

determining, via the one or more processors, an adaptive component based on an algorithm that represents a previous correction factor as a function of the first set of measured outputs, wherein the algorithm is based on least squares regression, auto-regression moving average, subspace identification, or linear quadratic estimator;

determining, via the one or more processors, a current correction factor comprising a product of the filter component and the adaptive component;

receiving, via the one or more processors, a second set of inputs associated with the power generation system, wherein the second set of inputs comprise the one or more operating parameters related to the power generation system;

generating, via the one or more processors, a second set of modeled outputs of the power generation system based on the model of the power generation system, the second set of inputs, and the current correction factor; and a second set of modeled outputs of the power generation system controlling, via the one or more processors, an operation of the power generation system based on the second set of modeled outputs.

16. The method of claim 15, wherein the first set of modeled outputs comprises a modeled power output, a modeled exhaust temperature, a modeled compressor condition, or any combination thereof.

17. The method of claim 15, wherein the second set of modeled outputs comprises a modeled power output, a modeled exhaust temperature, a modeled compressor condition, or any combination thereof.

18. The method of claim 15, wherein the first set of measured outputs comprises power output, exhaust temperature, a compressor condition, or any combination thereof.

19. One or more tangible, non-transitory, machine-readable media, comprising machine-readable instructions to cause one or more processors to:

receive a first set of inputs associated with a power generation system, wherein the first set of inputs comprise one or more input operating parameters of the power generation system;

generate a first set of modeled outputs of the power generation system based on a model of the power generation system and the first set of inputs;

receive a first set of measured outputs of the power generation system via one or more sensors of the power generation system, wherein the first set of measured outputs correspond to the first set of modeled outputs;

determine a filter component that, when applied to the model of the power generation system, approximately matches the first set of modeled outputs to the first set of measured outputs;

determine an adaptive component based on an algorithm that represents a previous correction factor as a function of the first set of measured outputs, wherein the algorithm is based on least squares regression, auto-regression moving average, subspace identification, or linear quadratic estimator;

determine a first correction factor comprising a product of the filter component and the adaptive component;

receive a second set of inputs associated with the power generation system, wherein the second set of inputs comprise the one or more input operating parameters of the power generation system;

generate a second set of modeled outputs of the power generation system based on the model of the power generation system, the second set of inputs, and the first correction factor; and control an operation of the power generation system based on the second set of modeled outputs.

20. The machine-readable media of claim 19, wherein the one or more input operating parameters comprise one or more ambient conditions of the power generation system, one or more angles of one or more inlet guide vanes of the power generation system, amount of fuel flowing to a combustor of the power generation system, rotational speed of the e power generation system, or any combination thereof.

* * * * *